J. N. WOOD.
BALE BOX.
APPLICATION FILED APR. 23, 1909. RENEWED MAY 17, 1910.
971,952.
Patented Oct. 4, 1910.
2 SHEETS—SHEET 1.
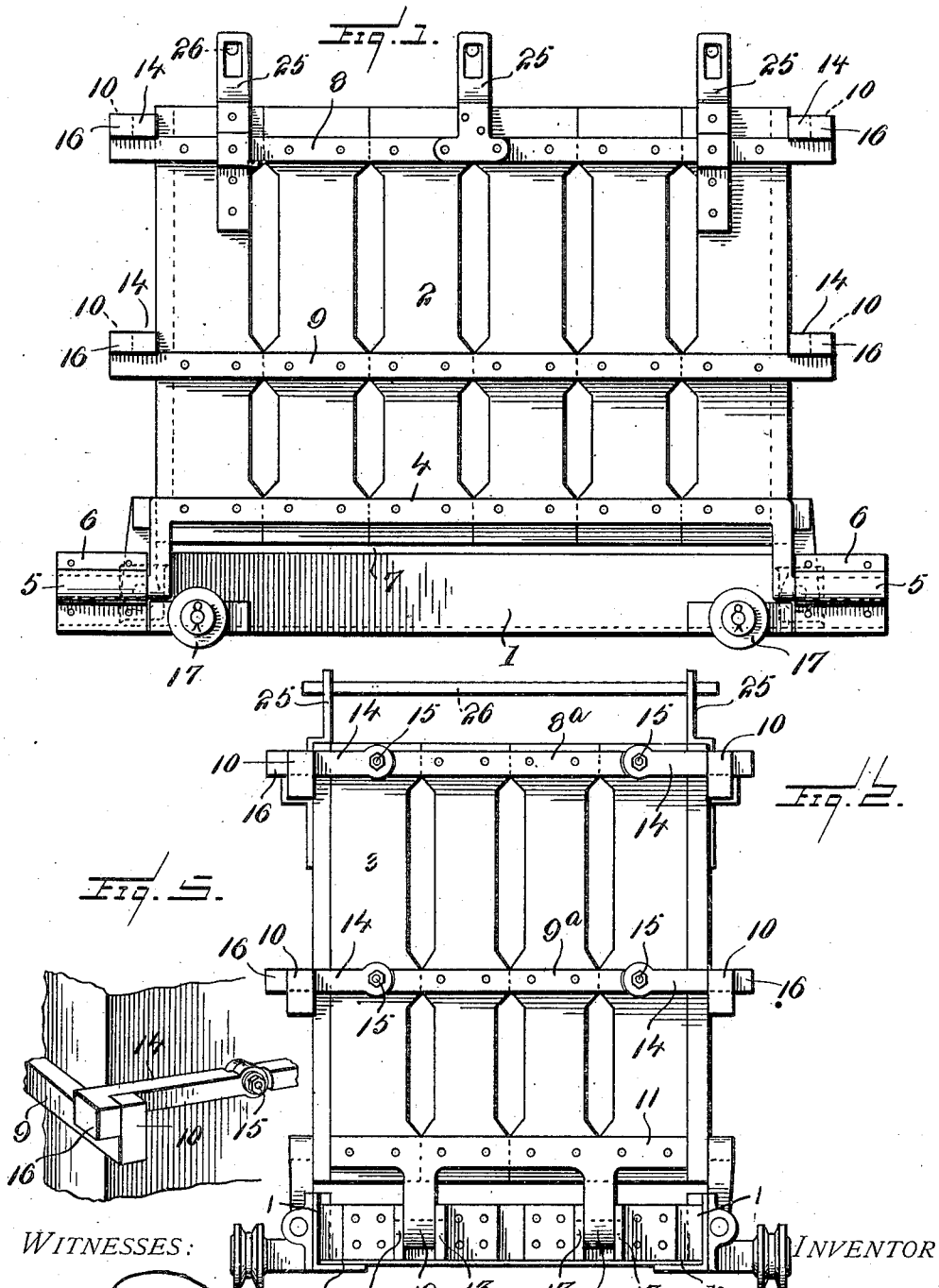

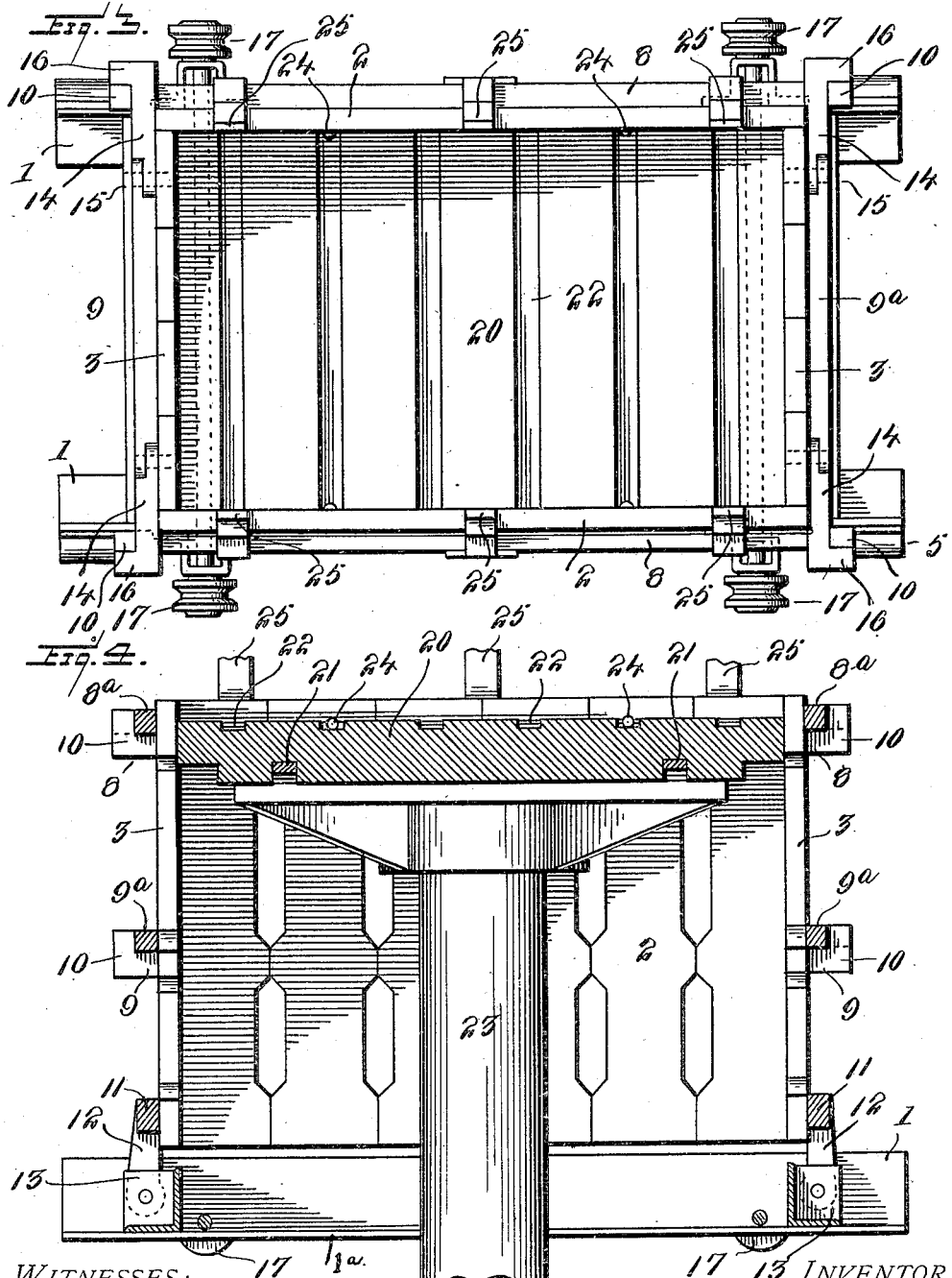

UNITED STATES PATENT OFFICE.

JAMES N. WOOD, OF RICHMOND, VIRGINIA, ASSIGNOR TO THE NEELY COMPRESS AND COTTON CO., INC.

BALE-BOX.

971,952.  Specification of Letters Patent.  Patented Oct. 4, 1910.

Application filed April 23, 1909, Serial No. 491,853. Renewed May 17, 1910. Serial No. 561,903.

*To all whom it may concern:*

Be it known that I, JAMES N. WOOD, citizen of the United States, residing at Richmond, in the county of Henrico and State of Virginia, have invented certain new and useful Improvements in Bale-Boxes; and I do hereby declare the following to be a full, clear, and exact description of the invention, such as will enable others skilled in the art to which it appertains to make and use the same.

My invention consists in the novel features hereinafter described reference being had to the accompanying drawings which illustrate one form in which I have contemplated embodying my invention and said invention is fully disclosed in the following description and claims.

Referring to the said drawings, Figure 1 represents a side elevation of a bale box embodying my invention. Fig. 2 is an end elevation of the same. Fig. 3 is a top plan view of the same. Fig. 4 is a vertical central longitudinal section showing the bottom raised by a hydraulic plunger or other pressure device. Fig. 5 is a detail view of one of the securing devices for locking the sides and ends together.

The object of my invention is to provide a knock down bale box for use in connection with baling presses, in which the bale is formed in the box and removed from the press for wrapping and applying the bale bands, and said box is specially adapted for use with the type of baling press shown and described in my former applications for Letters Patent Serial No. 479,380 filed Feb. 23, 1909 and Serial No. 487,229 filed April 1, 1909, although it may be used with other forms of baling press.

As illustrated in the drawings my improved bale box comprises a bottom frame 1 of rectangular shape and preferably formed of metal, to which are hinged the two sides 2, 2, and the two ends 3, 3.

In the exemplification of my invention which I have selected for illustration, the sides and ends are formed of heavy wooden pieces disposed vertically and connected and reinforced by exterior horizontally disposed metal bars. The sides 2, 2 are each provided with a bar 4 near the bottom, the ends of which extend downward and are provided with trunnions 5 engaging bearings 6 on the bottom frame 1, forming the hinge connections with the bottom frame. The lower edges of the sides 2, 2 are slightly higher than the bottom frame leaving a horizontal slit 7, through which the ends of the burlap cover for the bale may project. Each side 2 is provided near the top with a horizontal reinforcing bar 8 and I prefer to employ a similar bar 9 between the upper and lower edges. The bars 8 and 9 preferably project beyond the ends of the sides 2, and are bent upwardly to form locking studs or projections 10.

The ends 3, 3 are provided near their lower edges each with a reinforcing bar 11 from which depend the hinge members 12, pivotally connected to brackets 13, 13 secured to the bottom frame, and said ends are also provided with the top and median reinforcing bars 8ª and 9ª. In order to securely lock the sides and ends together when in raised position I provide each of the bars 8ª and 9ª at each end with a hook 14 pivoted thereto at 15 and forming a continuation of the bar with which it is connected, each of said hooks extending beyond the attached lateral edge of the end 3, and having a horizontally disposed projection 16 adapted to engage the outer side of the adjacent locking stud 10, on one of the bars 8 or 9, as clearly illustrated in the drawings. While I have shown the hooks 14 on the end walls and the locking studs 10 on the side walls, this arrangement could be reversed without departing from my invention. The construction of these parts is such that the hook body falls within the locking stud 10, which is itself within the projection 16, so that the side and end which they connect are each held against movement. By simply raising the hooks 14, the sides and ends may be swung down into a horizontal position.

The bottom frame 1 is preferably provided with a pair of supporting rollers 17, 17 on each side, which are mounted in this instance on transverse shafts secured in the bottom frame, and said rollers are preferably grooved to enable them to engage suitable tracks provided for the purpose in the baling frame of the press shown in my former applications referred to.

20 represents the bottom of the box which may be formed of heavy wooden planking and strengthened by metal cleats 21, as indicated in Fig. 4 or made in any other desired way, and of any suitable material.

The bottom 20 is provided on its upper surface with a plurality of transverse grooves 22, to facilitate the insertion of the bale ties. The bottom 20 is free to move vertically within the box, and rests on the flanges 1$^a$ of the bottom frame 1, when the box is empty. The bottom is raised in the box before the commencement of the baling operation by the plunger of the hydraulic pressure device, indicated at 23, and when near the top engages short studs 24, 24 on the sides 2 of the box so that further upward movement of the plunger will raise the box bodily with it into operative relation with the baling devices, as set forth in my former applications referred to. I also prefer to provide the lateral walls of the bale box with securing devices to receive retaining bars, which are inserted therein after the bale is completed to hold the bale from expanding until it is wrapped and tied. In this instance I have shown the side walls 22 each provided with three slotted plates or ears 25, 25 extending above the same and adapted to receive transverse retaining bars 26 which are shown in dotted lines.

What I claim and desire to secure by Letters Patent is:—

1. A bale box comprising a bottom frame, end and side walls hinged thereto, means for locking said end and side walls together, when closed, a bottom adapted to rest upon said bottom frame and be supported thereby, said bottom being movable vertically with respect to the bottom frame.

2. A bale box comprising a bottom frame, end and side walls hinged thereto, a bottom movable vertically with respect to said walls, and stops on said walls adjacent to the top for arresting the upward movement of the bottom with respect thereto.

3. A bale box comprising a bottom frame, a bottom superimposed thereon and provided on its upper face with bale band recesses, lateral walls hinged to the bottom frame and having their lower edges cut away, end walls and means for connecting said side and end walls.

4. A removable knock down bale box provided with a bottom frame having a central aperture therein, lateral walls hinged to said bottom frame, a bottom of greater size than the said aperture, located above the bottom frame and movable vertically in said box, bale retaining devices adapted to extend across the top of said box, and means for securing said retaining devices to two opposite lateral walls of the box.

5. A bale box comprising a bottom frame, a bottom superimposed thereon but vertically movable with respect thereto and provided with bale band recesses, end walls secured to said bottom frame, lateral walls pivotally connected to the bottom frame, securing devices on two opposite walls for engaging transverse retaining bars and means for connecting said side and end walls.

6. A removable knock down bale box, comprising a bottom frame, having a central aperture therein, a bottom of greater size than the aperture in said bottom frame, adapted to rest on said bottom frame when in its lowest position, lateral walls pivoted to said bottom frame and inclosing said movable bottom, upwardly projecting ears secured to two opposite lateral walls, and transverse retaining bars, adapted to extend across the top of the box and engage said ears.

In testimony whereof I affix my signature, in the presence of two witnesses.

JAMES N. WOOD.

Witnesses:
WM. P. DE SAUSSURE,
CHAS. E. DEMY.